US012683348B2

(12) United States Patent
Tench

(10) Patent No.: US 12,683,348 B2
(45) Date of Patent: Jul. 14, 2026

(54) WIDEBAND HYBRID FIBER AMPLIFIERS AND LASERS OPERATING IN THE 2000 NM WAVELENGTH REGION

(71) Applicant: RET and Associates LLC, Allentown, PA (US)

(72) Inventor: Robert Ehrler Tench, Allentown, PA (US)

(73) Assignee: RET and Associates LLC, Allentown, PA (US)

( * ) Notice: Subject to any disclaimer, the term of this patent is extended or adjusted under 35 U.S.C. 154(b) by 0 days.

(21) Appl. No.: 18/761,674

(22) Filed: Jul. 2, 2024

(65) Prior Publication Data

US 2026/0011971 A1    Jan. 8, 2026

(51) Int. Cl.
| | |
|---|---|
| *H01S 3/067* | (2006.01) |
| *H01S 3/00* | (2006.01) |
| *H01S 3/094* | (2006.01) |
| *H01S 3/10* | (2006.01) |
| *H01S 3/16* | (2006.01) |

(52) U.S. Cl.
CPC ........ *H01S 3/06716* (2013.01); *H01S 3/0064* (2013.01); *H01S 3/094015* (2013.01); *H01S 3/1003* (2013.01); *H01S 3/161* (2013.01); *H01S 3/1616* (2013.01)

(58) Field of Classification Search
CPC ..... H01S 3/06716; H01S 3/161; H01S 3/1616
See application file for complete search history.

(56) References Cited

U.S. PATENT DOCUMENTS

| | | | |
|---|---|---|---|
| 10,348,051 | B1 | 7/2019 | Shah et al. |
| 11,276,982 | B2 | 3/2022 | Delavaux et al. |
| 2016/0087394 | A1* | 3/2016 | Swanbeck ........... H01S 5/02355 |
| | | | 372/22 |
| 2018/0159296 | A1* | 6/2018 | Johnson .............. H01S 3/06758 |
| 2018/0203186 | A1* | 7/2018 | Kitahara ............ G02B 6/03616 |
| 2021/0226403 | A1* | 7/2021 | Delavaux ............ H01S 3/06758 |

(Continued)

OTHER PUBLICATIONS

Z. Li, et al., Diode-pumped wideband thulium-doped fiber amplifiers for optical communications in the 1800-2050 nm window, Nov. 4, 2013 | vol. 21, No. 22 | DOI: 10.1364/OE.21.026450 | Optics Express 26450-26455.

(Continued)

*Primary Examiner* — Xinning(Tom) Niu
(74) *Attorney, Agent, or Firm* — Mark T. Vogelbacker; Eckert Seamans Cherin & Mellott, LLC

(57) ABSTRACT

A hybrid optical fiber amplifying device is proposed that is based upon a concatenated combination of a section of Tm-doped fiber (TDF) followed by a section of Ho-doped fiber (HDF). The doped fiber sections are configured to be no more than a few meters in length. Using the sections of doped fiber in this order (i.e., TDF followed by HDF) has been found to provide amplification of input signals over a relatively wide wavelength band from about 1725 nm to about 2105 nm (thus exhibiting a useful wideband range of about 380 nm). The use of pump beams operating at several Watts of power have been found to yield multi-Watt output signals. The wideband hybrid device itself may take the form of an amplifier, laser (including a ring laser configuration), or a source of amplified stimulated emission (ASE).

6 Claims, 12 Drawing Sheets

(56) References Cited

U.S. PATENT DOCUMENTS

2021/0328400 A1* 10/2021 Delavaux ........... H01S 3/09415

OTHER PUBLICATIONS

R. E. Tench, et al., 25 W 2 μm broadband polarization-maintaining hybrid Ho- and Tm-doped fiber amplifier, vol. 58, No. 15 / May 20, 2019 / Applied Optics.

R. E. Tench, et al., Two-Stage Performance of Polarization-Maintaining Holmium-Doped Fiber Amplifiers, Journal of Lightwave Technology, vol. 37, No. 4, Feb. 15, 2019.

R. E. Tench, et al., In-Depth Studies of the Spectral Bandwidth of a 25 W 2 μm Band PM Hybrid Ho- and Tm-Doped Fiber Amplifier, Journal of Lightwave Technology, vol. 38, No. 8, Apr. 15, 2020, pp. 2456-2463.

R. E. Tench, et al., 2 μm Watt-Level Fiber Amplifiers, Lasers, and ASE Sources Pumped by Broadband ASE Pumps, Journal of Lightwave Technology, vol. 42, No. 24, Dec. 15, 2024, pp. 8881-8888.

W. Walasik, et al., 1760 nm Multi-Watt Broadband PM CW and Pulsed Tm-Doped Fiber Amplifier, Journal of Lightwave Technology, vol. 41, No. 12, Jun. 15, 2023, pp. 3916-3924.

R. E. Tench, Design of a Novel 31.5 THz Bandwidth Hybrid TDFA-HDFA at 2000 nm and Its Applications in Unregenerated DWDM Lightwave Transmission Systems, Journal of Optics and Photonics Research 2025, vol. 2(2) 55-66.

* cited by examiner (a)

(b)

(c)

—○— TDFA FIRST STAGE INPUT TO SECOND STAGE

WIDEBAND HYBRID FIBER AMPLIFIERS AND LASERS OPERATING IN THE 2000 NM WAVELENGTH REGION

TECHNICAL FIELD

Disclosed herein is a wide bandwidth (e.g., bandwidth>300 nm) hybrid fiber amplifier (or laser or ASE source) operating in the 2000 nm wavelength region and capable of generating multi-Watt levels of output power.

BACKGROUND OF THE INVENTION

Fiber-based optical amplifiers and lasers capable of operating in the 2000 nm wavelength region have an important role to play in many forward-looking applications. Rare earth elements such as Holmium (Ho) and Thulium (Tm) are known materials for generating amplification for these applications. Free-space transmission between earth and space is best provided at wavelengths that exhibit a low atmospheric attenuation (e.g., 2039 nm and 2130 nm). Applications such as measurement/sensing of concentrations of gases such as $CO_2$ and $CH_4$, generation of high energy 3-5 μm signals using 2.1 μm OPO lasers, future gravity wave interferometers operating at 2051 nm, and quantum physics experiments for control and manipulation of qubits in $^{133}Ba^+$ ions at 1762 nm in present and future quantum computing will depend on the ability to create high-power, reliable Ho-doped fiber amplifiers (HDFAs) and TM-doped fiber amplifiers (TDFAs).

While various types of HDFAs and TDFAs have been developed for specific, single wavelength applications, there has not been an appreciable effort toward creating a wide-band source that is operable in the 2000 nm waveguide region. Such a wideband component is considered to be a strategic building block for creating and implementing 2000 nm DWDM light systems, among other communication applications.

SUMMARY OF THE INVENTION

The needs remaining in the art are addressed by the present invention, which relates to a hybrid Tm and Ho doped fiber amplifying device utilizing a concatenated combination of a section of Tm-doped fiber (TDF) followed by a section of Ho-doped fiber (HDF). As will be described in detail below, it is intended that these doped fibers are used in this order; that is, an applied input signal first passes through a section of TDF, and then through a section HDF before exiting the wideband hybrid device configuration.

The wideband hybrid device itself may take the form of an amplifier, laser (including a ring laser configuration), or a source of amplified stimulated emission (ASE). Any suitable type of single-clad TDF and HDF may be used in the formation of the inventive device, as long as the spectral characteristics of the fibers are selected to yield the extremely wide operating bandwidth (i.e., >300 nm) desired for the novel configuration.

An exemplary embodiment of the present invention may take the form of a hybrid optical device comprising a concatenated arrangement of an input TDFA and an output HDFA. The input TDFA includes a section of Tm-doped optical fiber (TDF), a first pump source for supplying a first pump beam $P_1$ at a first predetermined pump wavelength $\lambda_{P1}$ known to induce optical amplification in the presence of Tm ions, and a first optical coupler for directing the first pump beam $P_1$ into the section of TDF. The output HDFA a section of Ho-doped optical fiber (HDF), a second pump source for supplying a second pump beam $P_2$ at a second predetermined pump wavelength $\lambda_{P2}$ known to induce optical amplification in the presence of Ho ions and a second optical coupler for directing the second pump beam $P_2$ into the section of HDF. The lengths the sections of TDF and HDF and the input powers of the first and second pump beams are selected so that a hybrid TDFA-HDFA optical device generates amplification over an input signal bandwidth between a lowest wavelength of about 1725 nm and a highest wavelength of about 2105 nm, providing a wideband hybrid TDFA-HDFA optical device.

The inventive wideband hybrid TDFA-HDFA optical device may be configured to perform as an optical amplifier, a wideband (1725-2105 nm) ASE source, or a fiber laser (either linear in form or having a ring architecture). In all cases, the TDFA-HDFA arrangement is found to provide multi-Watt amplification over the wideband signal range.

Other and further embodiments and aspects of the present invention will become apparent during the course of the following discussion and by reference to the associated drawings.

BRIEF DESCRIPTION OF THE DRAWINGS

Referring now to the drawings, where like numerals represent like parts in several views.

DETAILED DESCRIPTION

Figure 1:
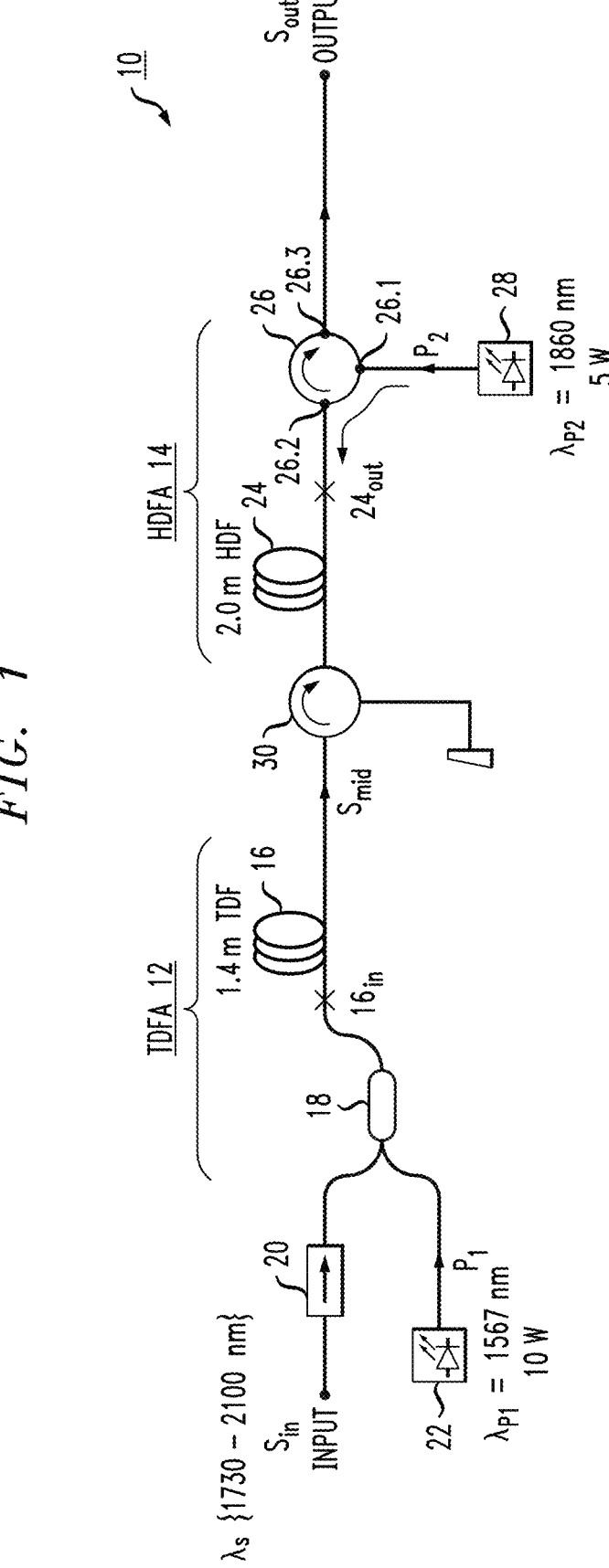
FIG. 1 illustrates an exemplary wideband TDFA-HDFA device formed in accordance with the principles of the present invention, in this case using a combination of a 1567 nm pump (for use with the TDFA portion), and a 1860 nm pump (for use with the HDFA portion)

FIG. 1 illustrates an embodiment of a wideband hybrid TDFA-HDFA optical device 10 formed in accordance with the principles of the present invention to operate in the 2000 nm region and provide multi-Watt amplification across a useable bandwidth in excess of 300 nm (preferably on the order of about 380 nm). For the purposes of the present discussion, the phrase "2000 nm region" is considered to span the wavelength range from about 1725 nm to about 2105 nm (thus, a bandwidth of 380 nm). Optical device 10 is shown as a two-stage (hybrid) device comprising a TDFA 12 as a first (input) stage, followed by an HDFA 14 as a second (output) stage.

TDFA 12 is shown as including a section of Tm-doped fiber (TDF) 16, which may be either a polarization-maintaining fiber or a single-mode fiber. A relatively short length of fiber is used in this case, typically less than three meters and preferably less than two meters (and shown here to be on the order of about 1.4 meters). A optical coupler 18 is included in TDFA 12 and is shown as positioned at the input termination $16_{in}$ of TDF 16 to introduce both an input optical signal and pump beam into TDFA 12. In this case, optical coupler 18 comprises a wavelength division multiplexer (WDM) that is able to combine the wavelengths of the input signal and pump beam, directing the combination into TDF 16. The arrangement of TDFA 12 is more particularly configured as a co-pumped amplifying device, with both an input signal $S_{in}$ and an input pump beam $P_1$ introduced to propagate in the same direction through TDF 16. Input signal $S_{in}$ is shown as passing through an input isolator 20 before being directed into TDF 16 by WDM 18. In an exemplary embodiment of the present invention, $S_{in}$ may operate at a signal wavelength $\lambda_s$ within the wideband signal range of about 1725 nm to 2105 nm.

Pump beam $P_1$ is shown in FIG. 1 as being supplied by a first pump source 22, which may preferably take the form of a fiber laser or a master oscillator power amplifier (MOPA). Pump beam $P_1$ is necessarily selected to operate at a wavelength known to excite the Tm ions within TDF 16 and provide gain to input signal $S_{in}$ as it passes through. One known wavelength $\lambda_{P1}$ is 1567 nm, as illustrated in FIG. 1.

For the purposes of ultimately generating a multi-Watt amplified output signal ($S_{out}$) from wideband hybrid optical device 10, first pump source 22 may be configured to generate a relatively high-power pump beam $P_1$ (the pump power being on the order of several watts, and shown in this example as operating at a power of 10 W). The amplified output from TDFA 12 (that is, the amplified version of $S_{in}$ exiting TDF 16) is denoted as $S_{mid}$ in FIG. 1.

Continuing with the description of wideband hybrid TDFA-HDFA optical device 10, HDFA 14 is shown as comprising a section of Ho-doped fiber (HDF) 24, which may either be polarization-maintaining fiber or single-mode fiber. Similar to TDF 16, the length of HDF 24 is preferably on the order of a few meters (no greater than fiber meters, for example), and preferably about two meters. In this case, a counter-pumped arrangement is used to implement HDFA 14, with a second pump beam $P_2$ shown as introduced into the output termination $24_{out}$ of HDF 24. In this embodiment, a first optical circulator 26 is disposed at the output of HDF 24 and used to introduce second pump beam $P_2$ to HDF 24. A circulator is preferred for use in this case over other types of optical coupling arrangements (such as the WDM used in TDFA 12) since the pump wavelength—as discussed hereafter—is within the possible range of the input signal (an arrangement referred to as "in-band" pumping).

In particular, for the case of exciting the Ho ions present in HDF 24, a wavelength $\lambda_{P2}$ of 1860 nm is used. A second pump source 28 (e.g., fiber laser, MOPA, or the like) is used to supply pump beam $P_2$, which is shown here as also being a rather high power beam (on the order of about 5 W). First optical circulator 26 takes the form of a three-port device, where second pump beam $P_2$ is coupled into input port 26.1 and propagates through circulator 26 to exit at bi-directional port 26.2. As shown in FIG. 1, bi-directional port 26.2 of optical circulator 26 is coupled to output termination $24_{out}$ of HDF 24. Second pump beam $P_2$ thus propagates in the reverse direction through HDF 24 with respect to initially-amplified signal $S_{mid}$ (i.e., counter-pumped) with any remaining pump energy being directed out of the primary signal path by a second optical circulator 30. As shown, second optical circulator 30 also functions to direct the amplified output from TDFA 12 (i.e., $S_{mid}$) into HDFA 14.

The amplified signal $S_{out}$ exiting HDF 24 will enter bi-directional port 26.2 and propagate through first optical circulator 26 to exit at output port 26.3, which forms the output signal path for wideband hybrid TDFA-HDFA optical device 10. For the purposes of the present invention, it is presumed that isolator 20, WDM 18, and optical circulators 26 and 30 are configured to operate properly over the entire signal bandwidth (e.g., 380 nm) of wideband hybrid optical device 10.

Figure 2:
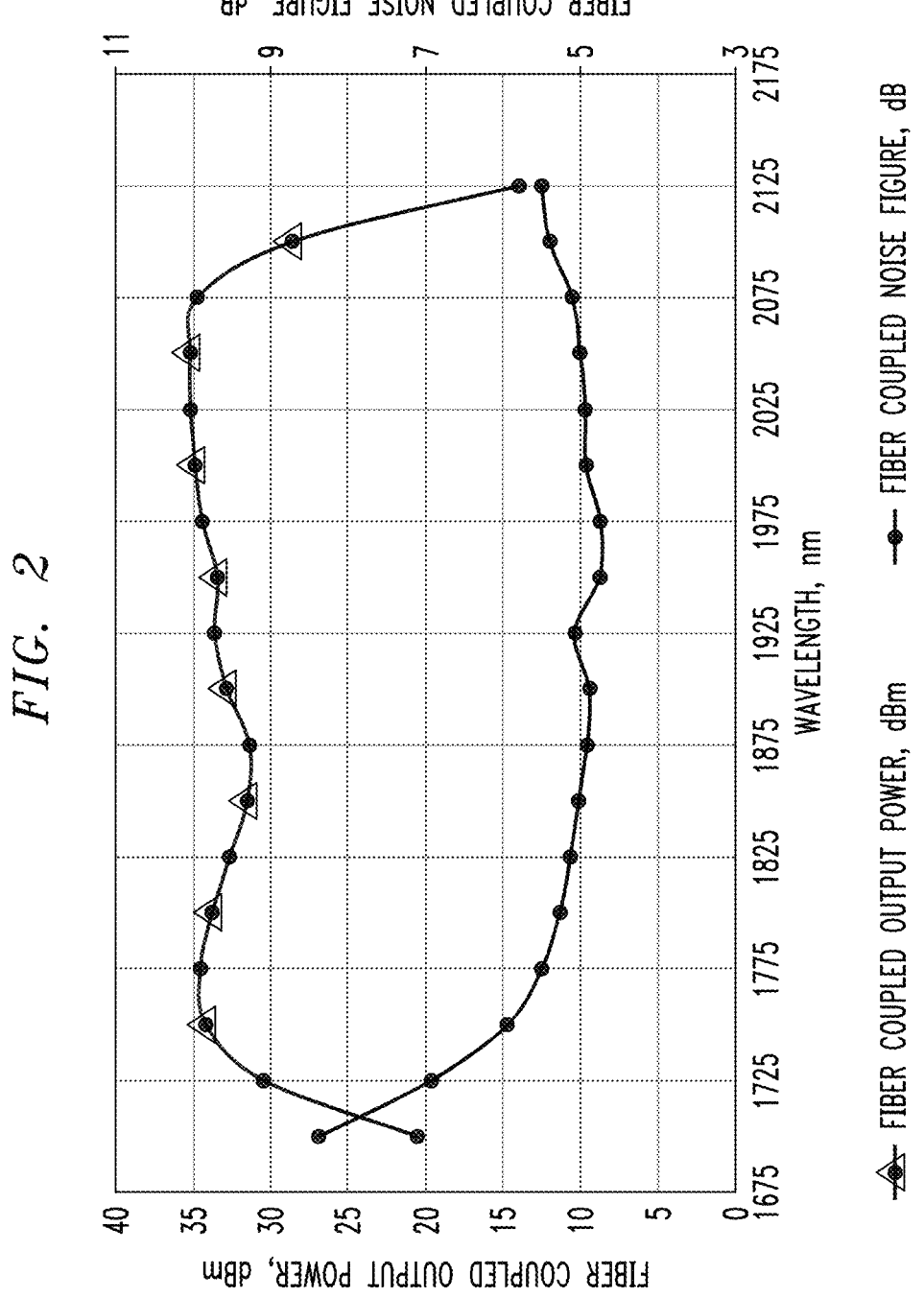
FIG. 2 is a plot depicting a wide operating bandwidth device shown in FIG. 1, in this case exhibiting an operating bandwidth on the order of about 380 nm, a separate plot of the noise figure associated with this device is also included in the graph of FIG. 2.

FIG. 2 contains plots of both the power of output signal $S_{out}$ and its associated noise figure NF, where these plots illustrate the changes in both output power and noise figure as a function of signal wavelength $\lambda_S$. The plots shown in FIG. 2, as well as those in the following drawings were prepared from simulation studies, but are considered as reliable inasmuch as previous fiber amplifier designs analyzed using the same simulators have been found to have an accuracy of ±0.5 dB in saturated output power and ±1.0 dB in small signal gain for both TDFA and HDFA designs. For the creation of these plots, $S_{in}$ was defined as have an input power of 0 dBm (10 mW), with the wavelength $\lambda_s$ ranging from 1700 to 2125 nm to generate the data as shown.

The results of FIG. 2 show that a wideband hybrid TDFA-HDFA optical device 10 as shown in FIG. 1 may achieve fiber-coupled multi-Watt output powers ranging from about 1.4 W to 3.3 W over the majority of the spectral operating band. The 6 dB width of the output power curve A is shown to be about 380 nm (i.e., from about 1725 nm to about 2105 nm). The noise figure of the wideband hybrid TDFA-HDFA optical device over this operating band is shown as being 6 dB or less, indicative of good noise figure performance of this multi-Watt, wideband device.

Figure 3:
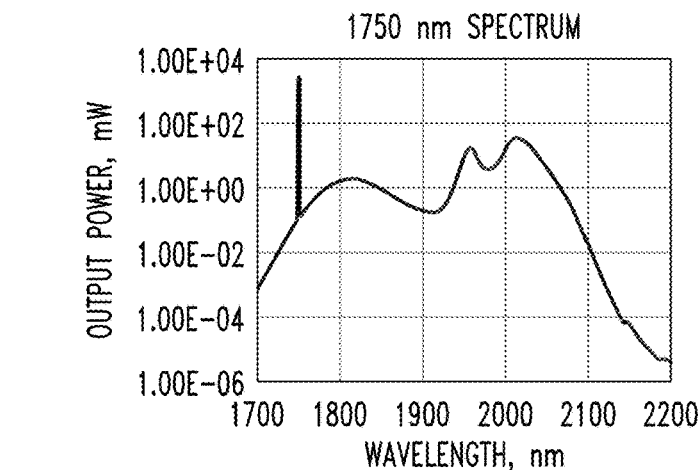
FIG. 3 is a graph of the output spectra (gain) for the wideband TDFA-HDFA device of FIG. 1 when used to provide amplification for three different selected input signal wavelengths within the defined wideband wavelength range of interest.
Figure 3:
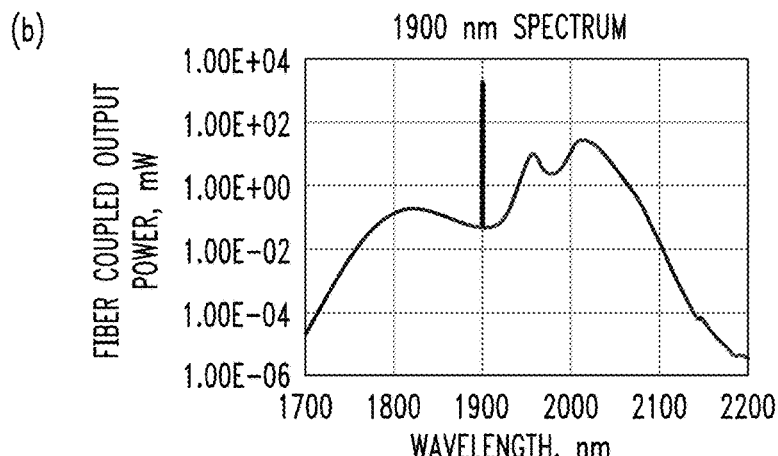
Figure 3:
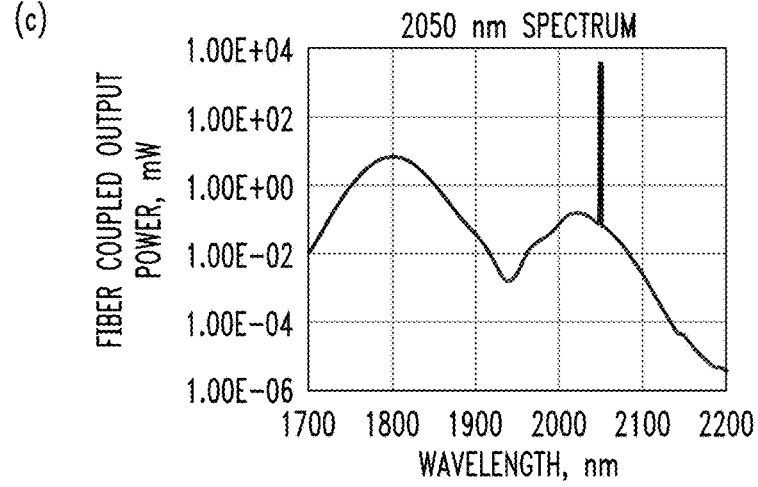

An analysis of the performance of wideband hybrid optical device 10 for three selected signal wavelengths is shown in FIG. 3. Here, the performance of optical device 10 for $\lambda_s$=1750 nm, 1900 nm, and 2050 nm are shown in spectral diagrams (a), (b), and (c), respectively. The input power was, again, held at 0 dBm (as for the data collected for FIG. 2). The optical signal-to-noise ratio (OSNR) values for these three signal wavelengths is shown as 48, 53, and 58 dB/0.1 nm, respectively.

Figure 4:
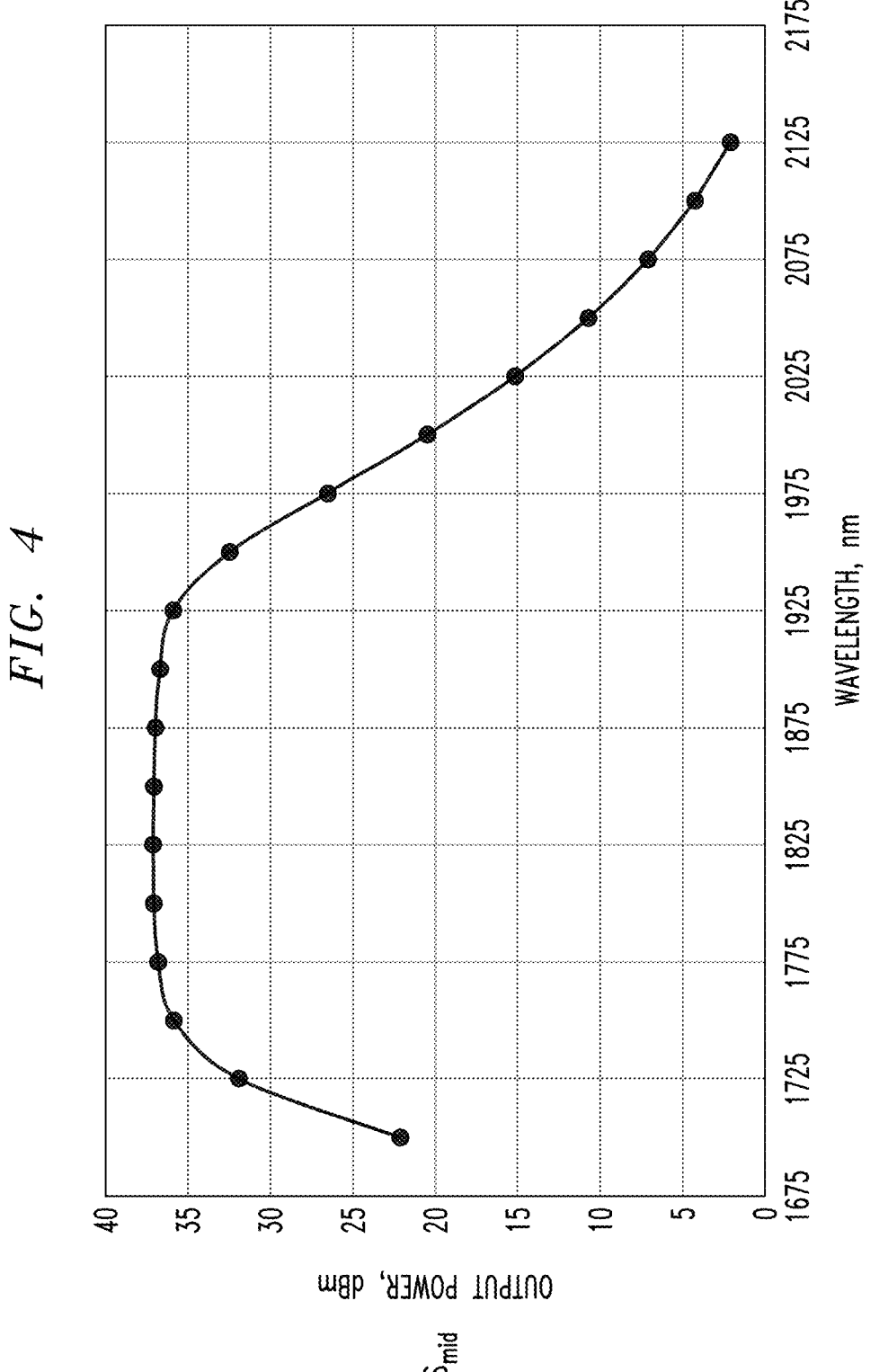
FIG. 4 contains a plot of the gain generated by a TDFA (input stage) component of the wideband TDFA-HDFA device of FIG. 1.
Figure 5:
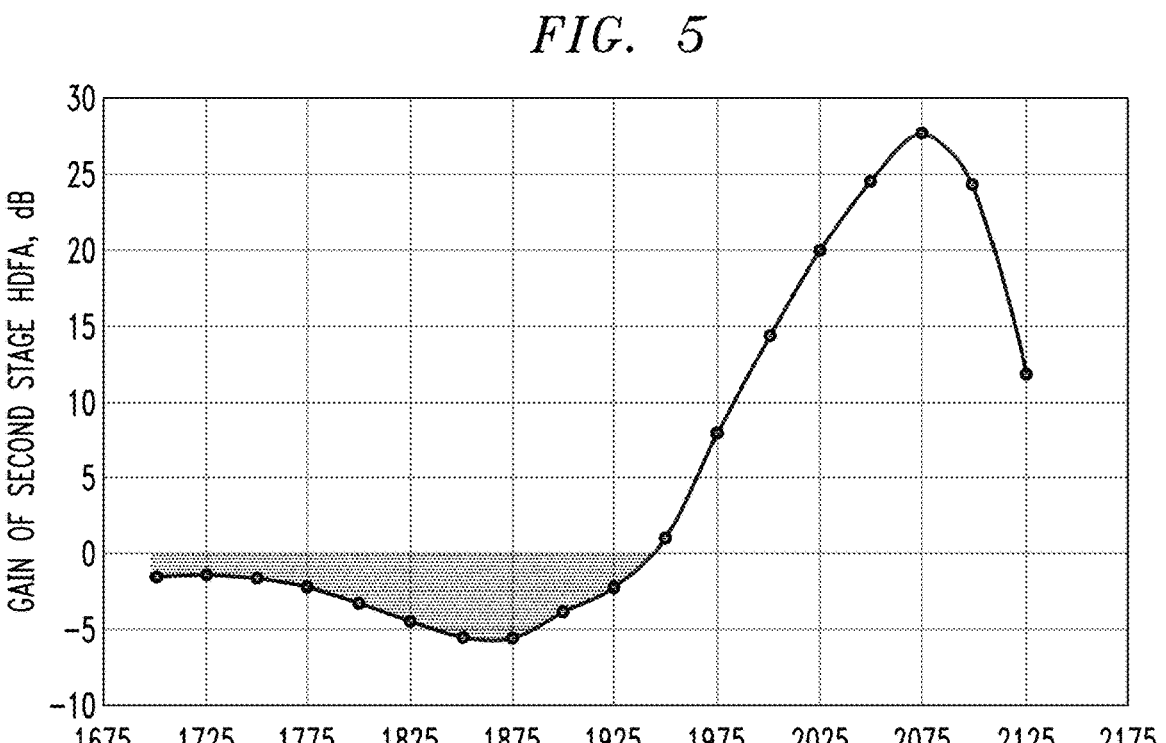
FIG. 5 is a plot of attenuation/gain associated with an HDFA subjected to the same input parameters as the TDFA input stage.
Figure 6:
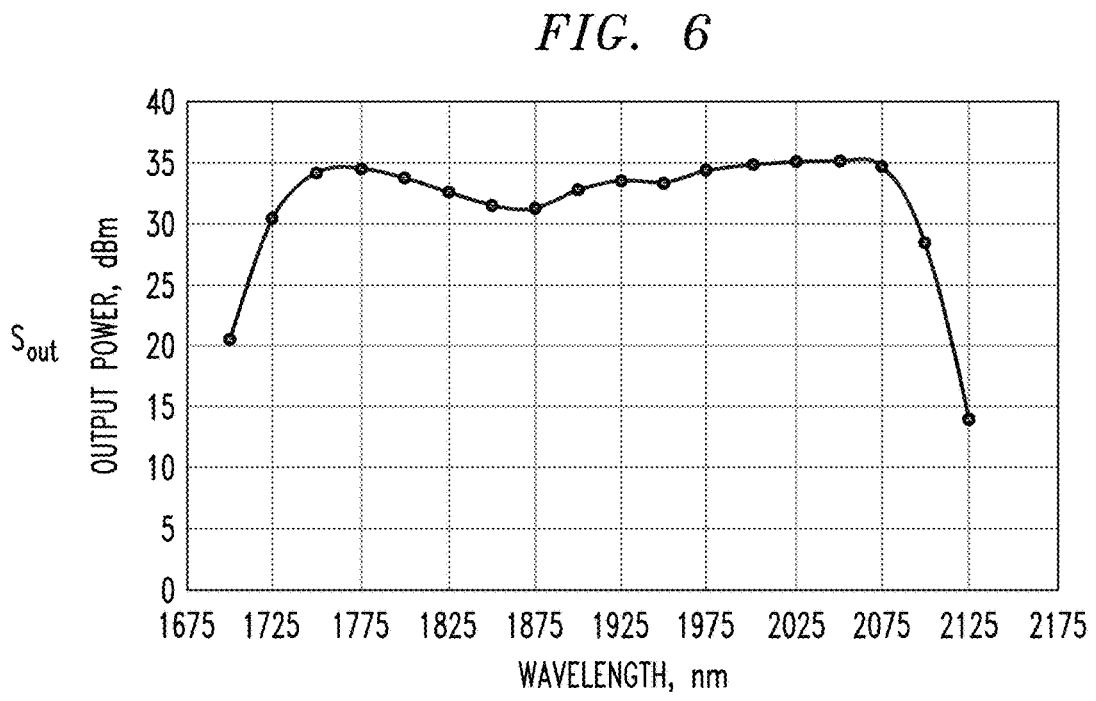
FIG. 6 is a plot of the wideband gain achieved by the hybrid TDFA-HDFA device of FIG. 1.

The plots shown in FIGS. 4-6 are useful in understanding the operating principles of a multi-Watt, wideband hybrid optical device formed in accordance with the present invention. First, FIG. 4 is a plot of output power as a function of signal wavelength for TDFA 12 as shown in FIG. 1. The input power was held at 0 dB, and pump beam $P_1$ was set to operate at the 10 W level. Looking at the plot of FIG. 4, it can be seen that the output power of $S_{mid}$ is quite high for input signals operating at a wavelength $\lambda$s within the range of about 1725 nm to 1950 nm. In the higher spectral range of 1975-2105 nm, the output power from TDFA 12 is shown to diminish significantly as the signal wavelength $\lambda_s$ increases (not a surprising result, since Tm ions are not an optimum choice for providing amplification at higher wavelength values).

FIG. 5 is a plot similar to that of FIG. 4, but in this case for a single-stage HDFA that is responsive to the same 0 dBm input power level over the same operating bandwidth. It is to be understood that the data of FIG. 5 is only for illustrative purposes of showing the gain (or attenuation) achieved for an HDFA under the same initial conditions, and does not reflect the performance of HDFA 14, which as shown in FIG. 1 is a second stage of a two-stage configuration and thus receives an amplified signal $S_{mid}$ as its input. Nonetheless, the data as shown in FIG. 5 clearly shows that an Ho-based fiber amplifier acts as an attenuator over an input signal wavelength range of about 1700-1950 nm; at signal wavelengths beyond the 1950 nm value, the Ho ions act as an effective, efficient amplifier (particularly for $\lambda_s$ in the range of about 1975-2125 nm).

Bearing in mind this response of an HDFA, the overall output from TDFA-HDFA device 10 takes the form as shown in FIG. 6, which is a plot of output power $P_{out}$ for output signal $S_{out}$ over the signal wavelength range of $\lambda_s$ of 1725 nm to 2105 nm. The relatively high power output from TDFA 12 over the wavelength range where an HDFA acts as an attenuator results in a continued, multi-Watt output from hybrid device 10 over the wide wavelength range of interest.

In applications based upon the use of monochromatic input signals, as well as with DWDM multi-frequency input signal combs, it may be desirable to further flatten the wavelength response as shown in FIG. 6. To that end, various types of gain-flattening filters (either fiber-based or fiber coupled, bulk optic devices) may be readily adapted for use in this bandwidth of interest.

Figure 7:
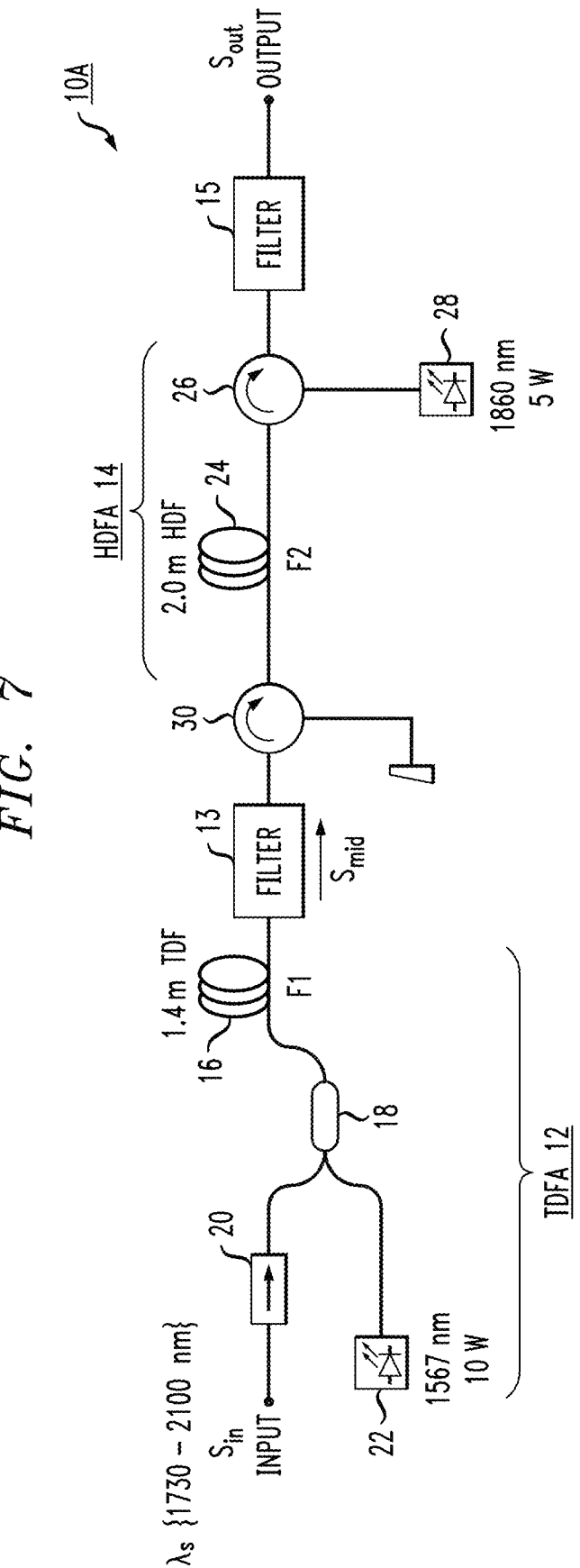
FIG. 7 shows another configuration of the embodiment of FIG. 1, in this case including a first gain-flattening filter at the output of the TDFA and a second gain-flattening filter at the output of the HDFA.
Figure 8:
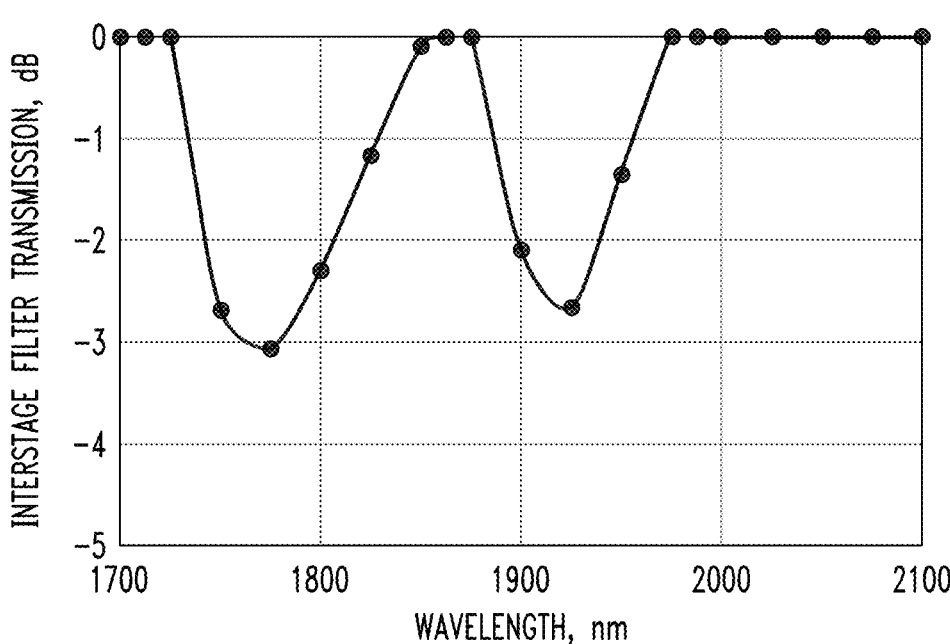
FIG. 8 depicts an exemplary filter characteristic that may be used for the first gain-flattening filter (i.e., at the output of the TDFA input stage)
Figure 9:
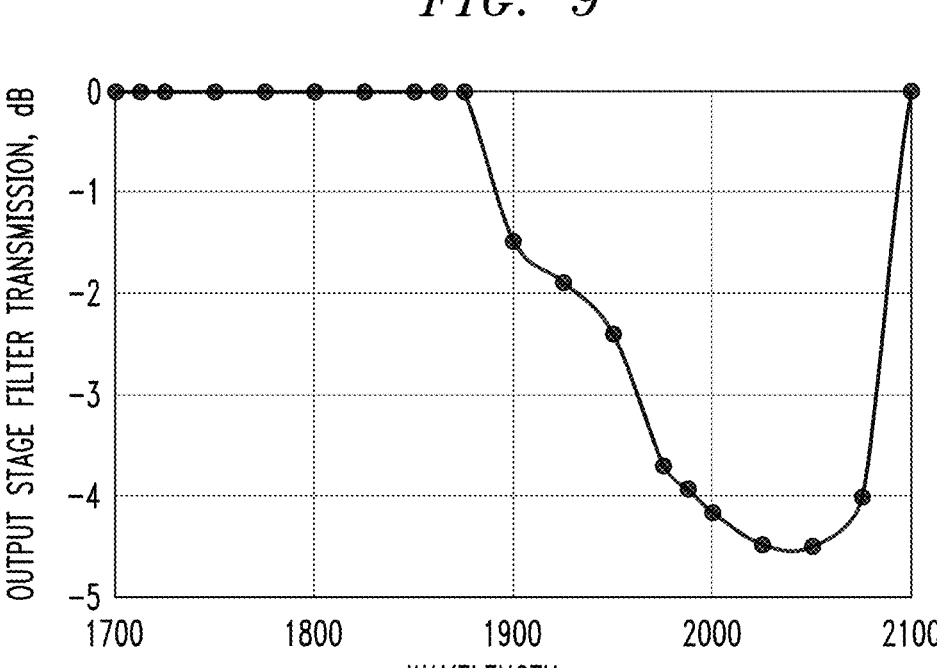
FIG. 9 depicts an exemplary filter characteristics that may be used for the second gain-flattening filter at the output of the hybrid TDFA-HDFA device.

For example, FIG. 7 depicts an alternative configuration of the embodiment of FIG. 1 (denoted as hybrid device 10A), which is formed to include a first gain-flattening filter 13 and a second gain-flattening filter 15. First gain-flattening filter 13 is disposed at the output of TDFA 12, and second gain-flattening filter 15 is shown as disposed at the output of HDFA 14. FIG. 8 is a plot of an exemplary gain(loss) vs. wavelength curve suitable for configuring the operation of first gain-flattening filter 13, while FIG. 9 contains a similar filter profile for second gain-flattening filter 15.

Figure 10:
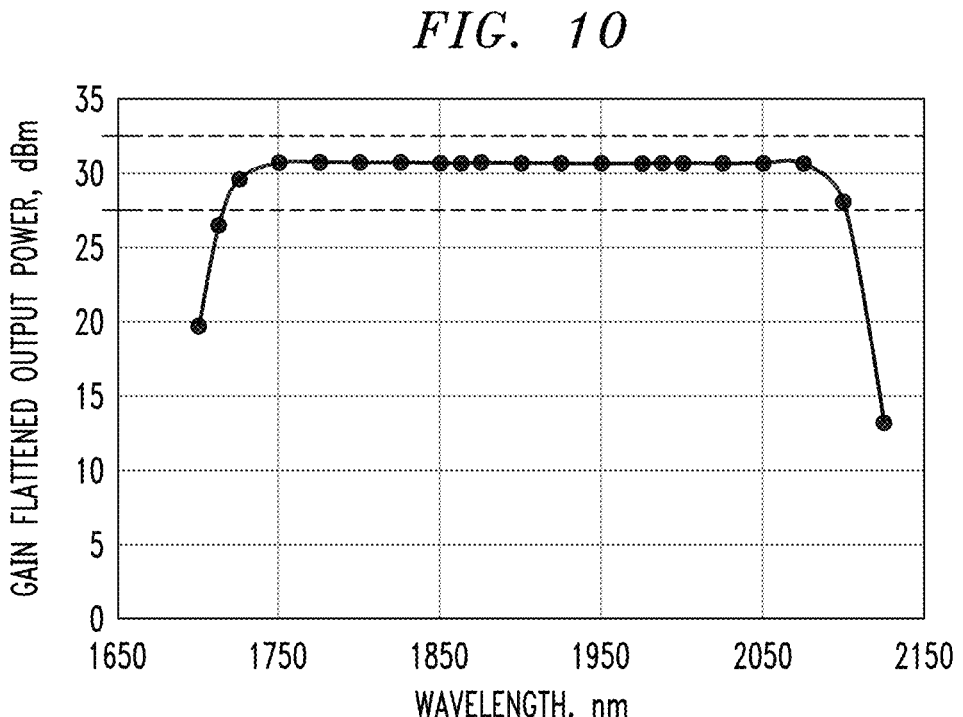
FIG. 10 is a plot of the optical output power over the 380 nm operating bandwidth of the device of FIG. 7, illustrating the relatively flat level of gain over the bandwidth of interest.
Figure 11:
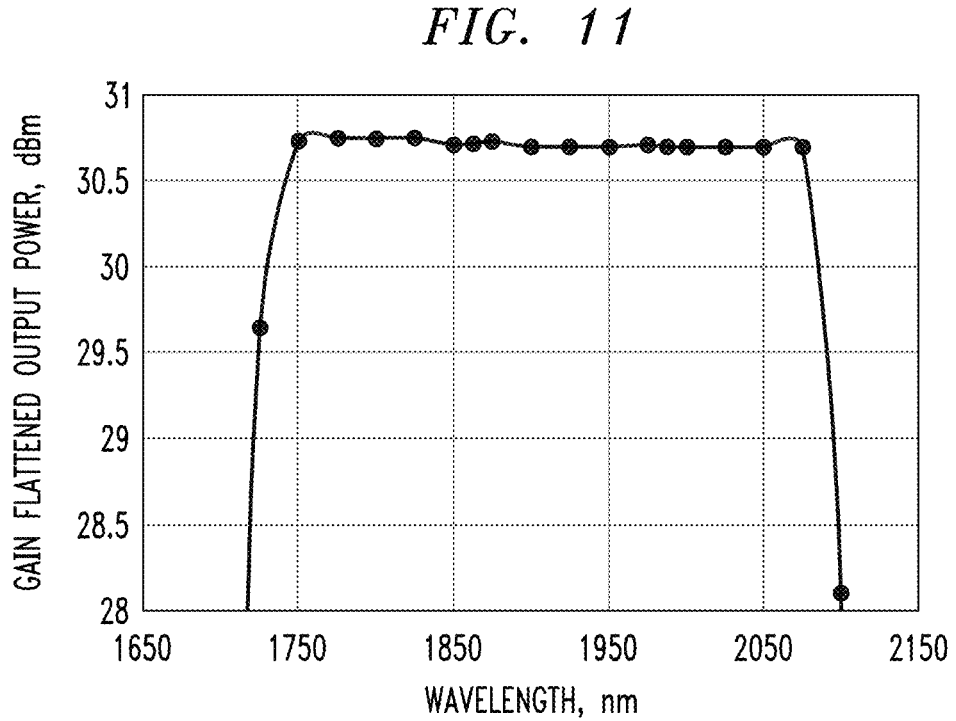
FIG. 11 is an enlargement of a portion of the plat of FIG. 10, increasing the vertical scale to further show the stability of the output power level (here, with a peak-to-peak variation no greater than 0.5 dB)

With first and second gain-flattening filters 13 and 15 disposed in their respective positions as shown hybrid device 10A of FIG. 7, the improvement in uniformity of the overall response of the TDFA-HDFA hybrid device takes the form as shown in FIG. 10. As shown, the measure of output power vs. wavelength is essentially constant to a high degree of flatness over the full 380 nm operating bandwidth of concern. FIG. 11 is an expanded vertical scale version of a portion of the plot of FIG. 10 covering the indicated range from 28 dBm to 31 dBm. This detailed portion of the response is shown to exhibit a gain flatness of much less than 0.5 dB peak-to-peak, allowing for the inventive configuration as shown in FIG. 7 to be well-suited for use in many important lightwave system and network applications.

Figure 12:
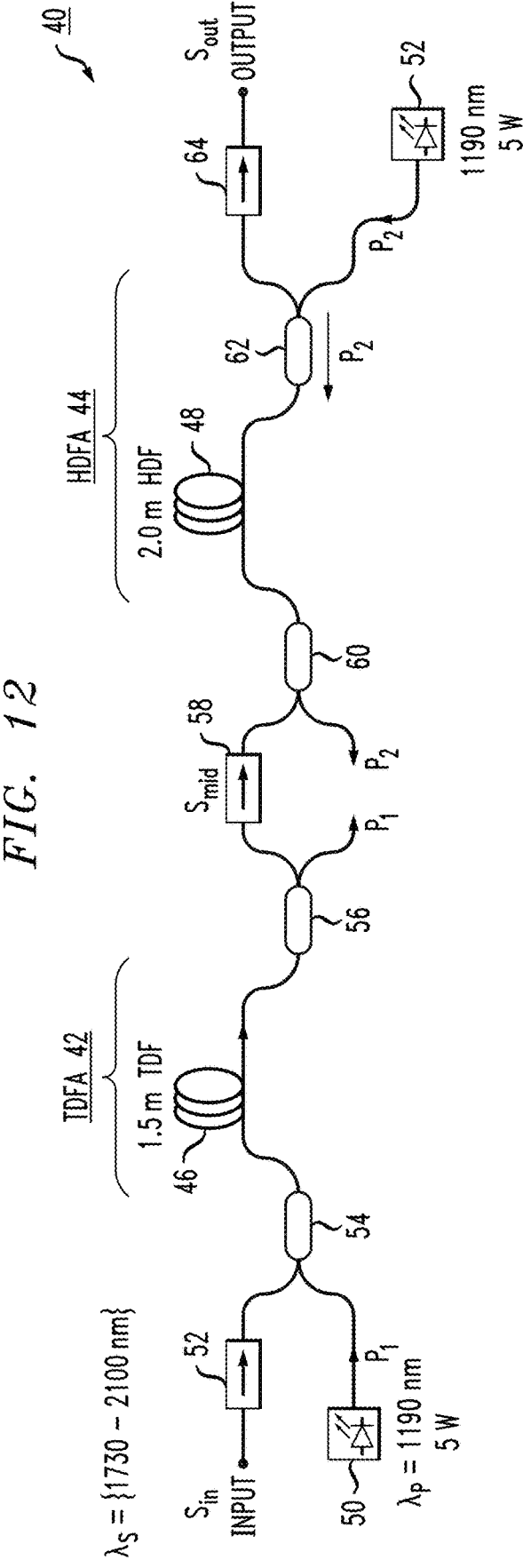
FIG. 12 illustrates another embodiment of the present invention, in this case using the same, out-of-band pump wavelength for both the input stage TDFA and output stage HDFA.

FIG. 12 illustrates another embodiment of the present invention, shown as a wideband hybrid TDFA-HDFA device 40 that utilizes out-of-band pumping for both an input stage TDFA 42 and an output stage HDFA 44.

While the use of in-band pumping as shown in configurations of FIGS. 1 and 7 has the advantage of exhibiting a lower quantum defect loss than out-of-band pumping, the system design may be difficult to implement in terms of requiring the use of a pump signal operating at a wavelength that is quite close to the signal wavelengths of interest. As a result, configurations utilizing in-band pumping place high demands on the performance of the WDMs used in the design (i.e., the ability to effectively separate the beams operating at the signal and pump wavelengths during demultiplexing) and often lead designers to use an optical circulator in place of the WDM. The out-of-band hybrid TDFA-HDFA device 40 of FIG. 11 is considered to yield improved noise figures (with respect to in-band designs) while also relaxing the performance demands of the WDMs.

Referring to FIG. 12, and similar to the embodiment described above, TDFA 42 includes a relatively short length of a section of Tm-doped fiber (TDF) 46 (again, being no more than a few meters in length and in this example shown as comprising a length of about 1.3 meters). HDFA 44 also includes a relatively short length of Ho-doped fiber (HDF) 48, shown here as being about two meters. An input signal $S_{in}$ (capable of using any wavelength within the wideband range of 1725-2105 nm) is applied as an input to TDFA 42, with the amplified output from this first stage identified as $S_{mid}$ in FIG. 12. Thereafter, $S_{m}$id is applied as an input to HDFA 44 for additional amplification, creating high-power output signal $S_{out}$.

In the arrangement as shown in FIG. 12, both TDFA 42 and HDFA 44 utilize a pump beam P operating at a wavelength $\lambda_P$ of 1190 nm (i.e., the same wavelength used to excite both Tm and Ho ions). Indeed, it is known that pump beams operating over the wavelength range of about 1150-1190 nm may be used for this purpose. Here, a first pump source 50 is used to supply a first pump beam $P_1$ operating at $\lambda_P$ of 1190 nm, and configured to generate a pump power on the order of 5 W. A second pump source 52 of similar design is used with HDFA 44. As with TDFA 12 of the previous design, TDFA 42 is a co-pumped arrangement, with input signal $S_{in}$ and first pump beam $P_1$ applied as separate inputs to a WDM 54, which then injects the combined signal and pump into TDF 46. As before, an input isolator 56 is included in this embodiment to prevent reflections from re-entering the input signal path. In actual implementation, a single pump source may be used, with a power splitter included at the output of the source to direct a first beam into TDFA 42 and a second beam into HDFA 44. For the particular configuration of FIG. 12, a 50/50 power splitter is depicted and provides equal powers on the order of five Watts to each stage.

In comparing the arrangement of FIG. 12 to that of FIGS. 1 and 7, it is noted that no optical circulators are required when using the out-of-band pumping arrangement of hybrid TDFA-HDFA device 70. Instead, simpler WDMs may be utilized, since the wavelength separation between the defined wideband range of the input signal (1725-2105 nm) and the pump beam is relatively large. This simplifies both the cost and complexity of the device. With continuing reference to FIG. 12, the amplified output from TDFA 42 is shown as passing through a WDM 56, which will direct any remaining pump energy away from the signal path, and allow the amplified output from TDFA 42 (denoted as mid-point amplified signal $S_{mid}$) to thereafter pass through an interface isolator 58 and WDM 60 before entering HDFA 44. As described below, WDM 60 is also used to direct any residual pump energy away from the hybrid optical device signal path.

HDFA 44 is shown as comprising a counter-pumped arrangement, with pump beam $P_2$ (also operating at $\lambda_P$=1190 nm) coupled into HDF 48 via a WDM 62 and used to impart additional amplification to the optical signal passing therethrough (that is, the amplified signal $S_{mid}$ exiting TDFA 12). Any remaining pump energy exiting at the opposite termination of HDF 48 will be directed away from the main signal path by WDM 60, as shown in FIG. 12. The amplified output signal $S_{out}$ from HDFA 44 passes through WDM and an output isolator 64 before exiting wideband hybrid TDFA-HDFA device 70.

In the illustrated configuration of wideband hybrid TDFA-HDFA device 70, isolators 52 and 64 perform the same functions as optical circulators 30 and 26 (respectively) in the configuration of device 10 as shown in FIG. 1 (as well as device 10A of FIG. 7). That is, isolators 52 and 64 function to isolate input stage TDFA 42 and output stage HDFA 44, and also minimize the effects of feedback from the outside fiber environment. It is to be noted that WDMs 56 and 60 may be considered as non-essential components and allow for residual pump energy to propagate in either direction. However, the inclusion of WDMs 56 and 60 ensure that isolator 52 is not affected by a high power out-of-band signal.

It is to be recalled that one type of TDFA-HDFA optical device that may be formed in accordance with the principles of the present invention is a wideband ASE source. Indeed, wideband ASE sources in the 2000 nm band are particularly useful in the rapid characterization of passive and active optical components in this spectral region. The wideband hybrid TDFA-HDFA embodiments as shown in FIGS. 1, 7 and 12 (as well as other possible embodiments) can be readily adapted to function as a multi-watt wideband ASE source by removing the applied input signal $S_{in}$. The presence of the pump beams within the sections of TDF and HDF generate the amplified spontaneous emission in a known manner.

Figure 13:
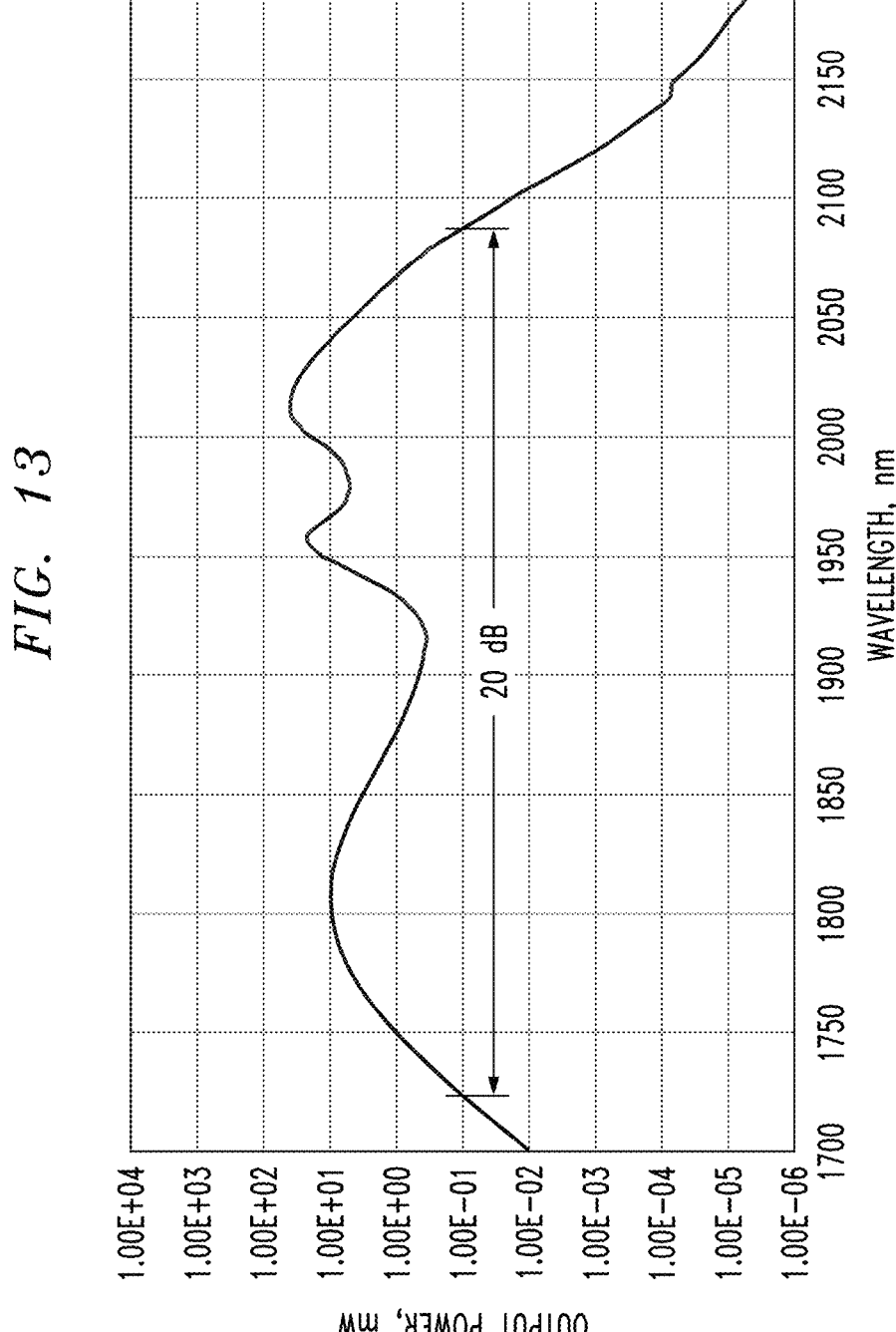
FIG. 13 is a plot of the spectral band associated with an ASE source created using the hybrid TDFA-HDFA arrangement of the present invention.

FIG. 13 is graph of the output spectrum of such an ASE source (with a resolution bandwidth (RBW) of 1 nm). The 20 dB bandwidth of the ASE source used to generate this data is shown as ranging from 1738 nm to 2076 nm (again, a wideband range of 338 nm). The fiber-coupled output power from this ASE source was found to be 2.57 W integrated over the entire spectrum. These results in terms of wideband range and output power for the hybrid TDFA- HDFA device of the present invention are considerably better than any achieved with prior art designs.

Figure 14:
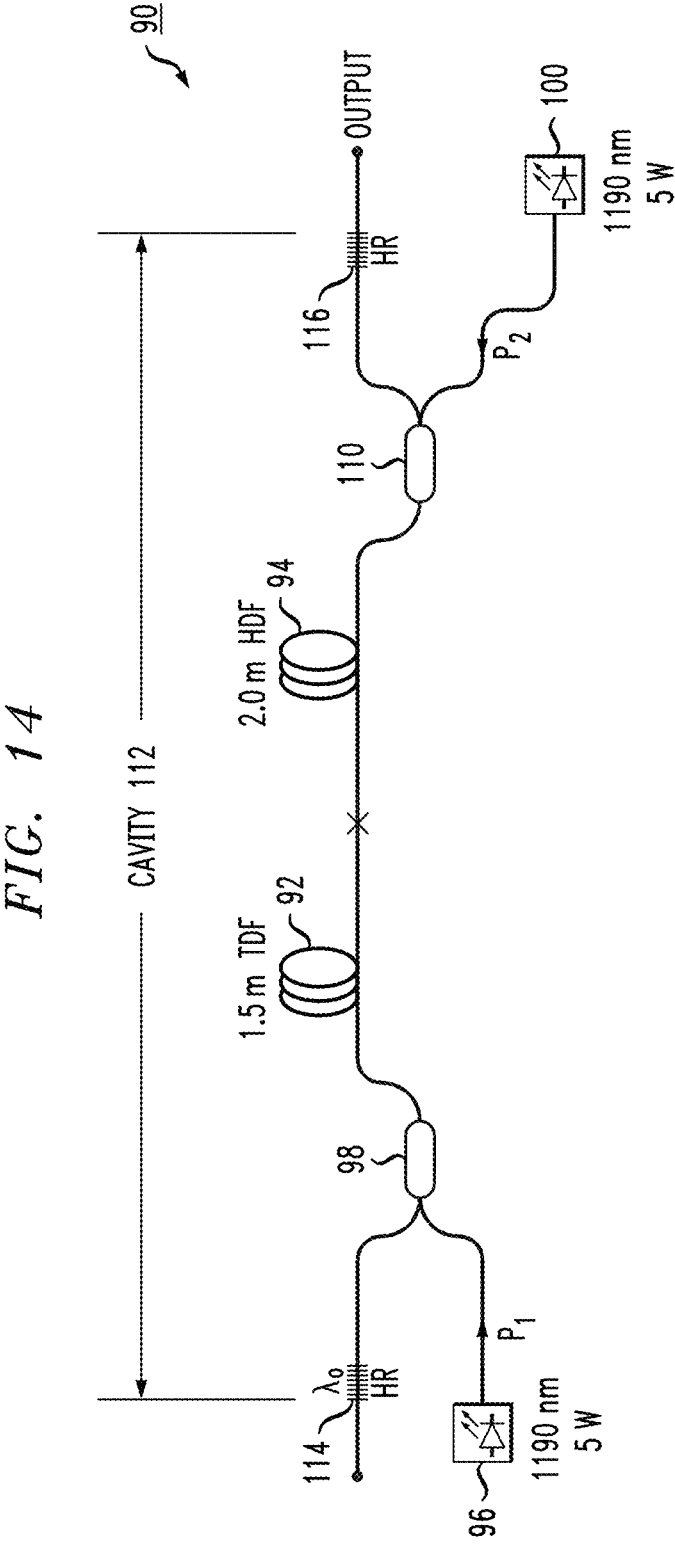
FIG. 14 shows yet another embodiment of the present invention, in this case a wideband linear fiber laser configured using the arrangement of FIG. 7 as its gain element.

Besides the use of the inventive wideband hybrid TDFA-HDFA devices as amplifiers or ASE sources, the arrangements as shown in FIGS. 1, 7, and 12 may also be adapted for use as laser sources and in this case offer a high output power over a wide band of lasing wavelengths. FIG. 14 depicts an exemplary hybrid TDFA-HDFA linear fiber laser 90 based upon the amplifier arrangement as shown in FIG. 12.

In particular, fiber laser 90 is shown as a hybrid device comprising a concatenated arrangement of a section of Tm-doped fiber (TDF) 92 and a section of Ho-doped fiber (HDF) 94, with both sections again having a length of no more than a few meters, as discussed above. Similar to the amplifier of FIG. 12, fiber laser 90 utilizes an out-of-band pump wavelength of 1190 nm, with a first pump source 96 used to direct a first pump beam $P_1$ through a first WDM 98 and into TDF 92. A second pump source 100 is disposed as shown to direct a second pump beam $P_2$ through a second WDM 110 and into HDF 94. A laser cavity 112 is created by the inclusion of a highly-reflective filtering element 114 (typically a fiber Bragg grating (FBG)) and a partially-reflective filtering element 116, disposed as shown. That is, highly-reflective element 114 is coupled to first WDM 98 and functions to re-direct reflected energy back into TDF 92, and partially-reflective element 116 is coupled to second WDM 110 in a manner that allows for a portion of the generated lasing emission to become the output of fiber laser 90, with the remainder re-directed into HDF 94. Elements 114 and 116 are configured to reflect only a defined lasing wavelength ko and thus provide a resonant cavity 112 across the concatenated arrangement of TDF 92 and HDF 94.

Figures 15, 16:
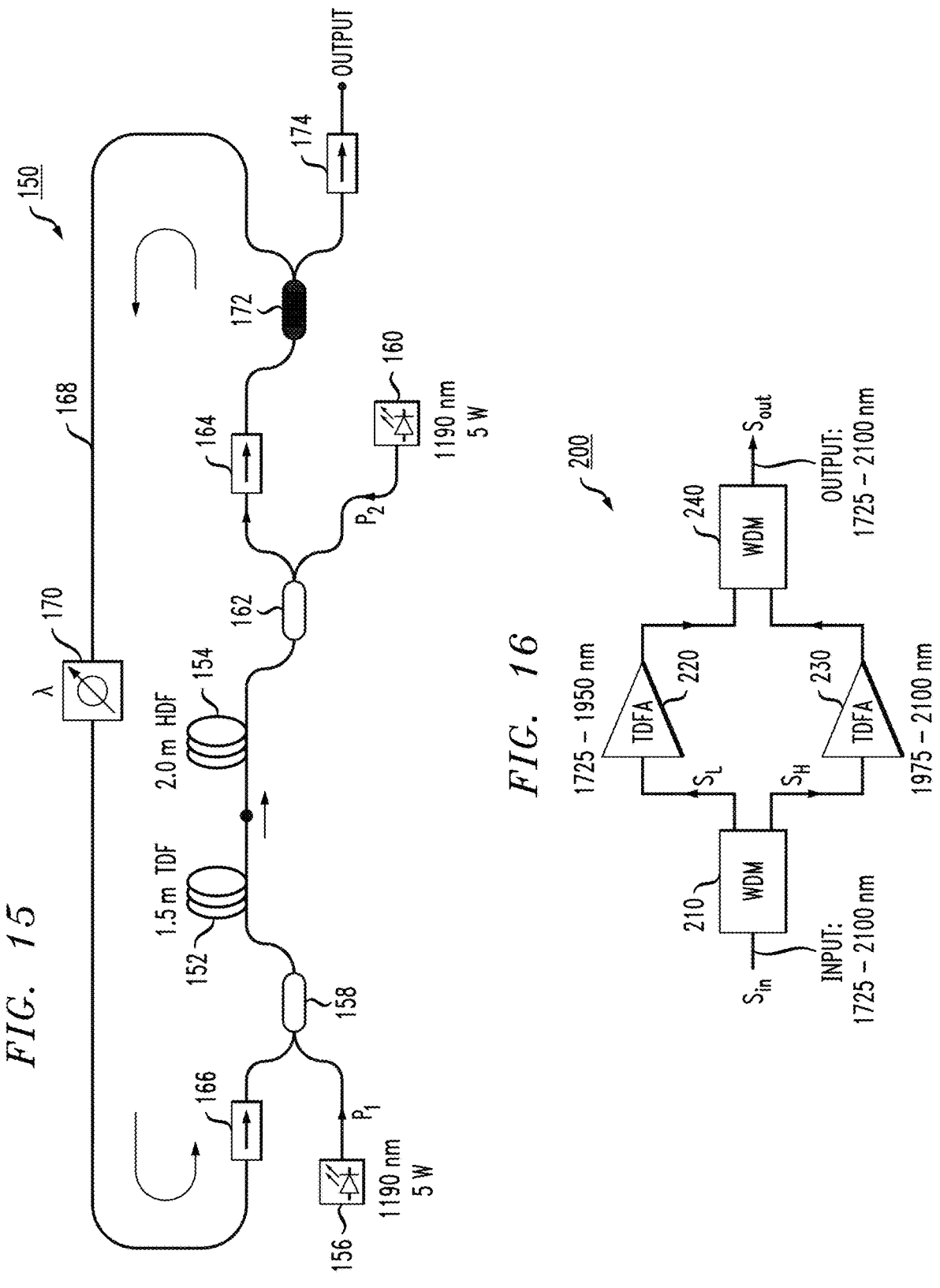
FIG. 15 illustrates an embodiment of the present invention in the form of a tunable ring fiber laser design.
FIG. 16 depicts yet another embodiment of a wideband hybrid device of the present invention, in this case where the TDFA and HDFA are disposed in a parallel arrangement, with wavelength selective devices used to direct an incoming signal to the optimum amplifier for its particular wavelength (i.e., a first, lower wavelength band directed into the TDFA and a second, higher wavelength band directed into the HDFA).

FIG. 15 illustrates another embodiment of a fiber laser source formed in accordance with the principles of a hybrid TDFA-HDFA device as described above. In particular, FIG. 15 depicts an exemplary wideband, tunable laser source 150 formed in a ring configuration. As shown, fiber ring laser 150 exhibits the same hybrid amplifying configuration as described above in the various device embodiments. That is, fiber ring laser 150 includes a concatenated arrangement of a section of TDF 152 and a section of HDF 154. A first pump source 156 is used to provide a first pump beam $P_1$ that is directed by a first WDM 158 into TDF 152. A second pump source 160 is used to provide a second pump beam $P_2$ that is directed by a second WDM 162 into HDF 154.

The ring topology is provided by the combination of a first isolator 164 (disposed beyond second WDM 162) and a second isolator 166 (disposed as an input to first WDM 158) and a section of optical fiber 168 disposed between first isolator 164 and second isolator 166. A tunable bandpass filter (TBF) 170 is shown as disposed along optical fiber path 168 and used to determine the specific lasing wavelength that is to be circulated around the ring that is formed as shown. The specific wavelength of TBF 116 is presumed to be a wavelength from within the wideband range of 1730-2100 nm associated with hybrid TDFA-HDFA arrangement of the present invention. A power splitter 172 is shown as disposed beyond first isolator 164 and is used to direct a portion of generated laser emission toward the output of fiber ring laser 90, while directing the remaining portion into optical fiber 168 to continue circulating around the ring. An output isolator 174 is shown as included along the output signal path to prevent reflections from entering the ring structure.

It is expected that the output powers over the full wavelength range for the configuration as shown in FIG. 10 will be between 100 and 400 mW. This output signal may thereafter be further amplified to a multi-Watt level of between 1.4 and 3.1 W (for example) by the use of a subsequent hybrid TDFA-TDFA optical device such as device 10 of FIG. 1, for example.

In some lightwave system and network applications, it is desirable and useful to employ a wideband TDFA/HDFA architecture that utilizes a parallel configuration of fiber amplifiers instead of the series arrangements described above. FIG. 16 shows one exemplary embodiment of a parallel wideband fiber amplifier device 200 formed in accordance with the principles of the present invention. In this architecture, an input signal $S_{in}$ is first passed through a three-port WDM filter 210 that separates the input signal into two separate spectral bands, shown as a first (low) spectral band signal $S_L$ (associated with input signals operating in the range of 1720-1950 nm) and a second (high) spectral band signal $S_H$, associated with input signals operating the wavelength range of 1975-2105 nm).

Signals $S_L$ falling within first spectral band are shown as applied as the signal input to a TDFA 220 which is similar in form and function to those discussed above. Signals $S_H$ falling within second spectral band are shown as applied as an input to a conventional HDFA 230. In a complementary manner, the amplified output from TDFA 220 is applied as a first input to a second WDM filter 240, with the amplified output from HDFA 230 applied as a second input to second WDM filter 240. The wavelength-multiplexed (combined) output from second WDM filter 240 again covers the full 380 nm operating bandwidth, in a manner similar to that of the serial arrangement.

While the principles of the invention have been described herein, it is to be understood by those skilled in the art that this description is made only by way of example and not as a limitation as to scope of the invention. Modifications and substitutions by one of ordinary skill in the art are considered to be within the scope of the present invention, which is not to be limited except by the following claims.

What is claimed is:

1. A method of amplifying light using a hybrid fiber optical amplifier comprising a Tm-doped fiber amplifier (TDFA) comprising Tm-doped fiber (TDF) coupled with a source of pumping light for exciting the Tm-doped fiber, an Ho-doped fiber amplifier (HDFA) comprising Ho-doped fiber (HDF) coupled with a source of pumping light for exciting the Ho-doped fiber, and an optical coupler connecting the TDFA to the HDFA to create an optical path therethrough beginning with the TDFA and continuing through the HDFA, the method comprising:

(a) introducing light to be amplified into the pumped TDFA, then (b) introducing the light to be amplified into the pumped HDFA wherein the amplified light is emitted from the hybrid fiber optical amplifier after passing through the pumped HDFA.

2. The method of claim 1, wherein the wavelength of the pumping light for exciting the Tm-doped fiber ($\lambda$Tm) and the pumping light for exciting the Ho-doped fiber ($\lambda$Ho) are outside the wavelengths of the input light to be amplified ($\lambda$I).

3. A method of amplifying light using a hybrid fiber optical amplifier, the method comprising:

(a) introducing light to be amplified into a Tm-doped fiber amplifier (TDFA) comprising Tm-doped fiber (TDF), then (b) introducing the light to be amplified into an Ho-doped fiber amplifier (HDFA) comprising Ho-doped fiber (HDF), then (c) emitting amplified light from the hybrid fiber optical amplifier.

4. The method of claim 3, further comprising:

coupling the HDF with a source of pumping light for exciting the Ho-doped fiber.

5. The method of claim 3, further comprising:

coupling the TDF with a source of pumping light for exciting the Tm-doped fiber.

6. The method of claim 3, wherein an optical coupler connects the TDFA to the HDFA to create an optical path therethrough.

\* \* \* \* \*